United States Patent
Cook

(10) Patent No.: US 9,139,482 B2
(45) Date of Patent: Sep. 22, 2015

(54) PARTICLIZED BIOTIC SOIL AMENDMENT

(71) Applicant: Robin J. Cook, Troutdale, OR (US)

(72) Inventor: Robin J. Cook, Troutdale, OR (US)

(73) Assignee: PermaMatrix, Inc., Portland, OR (US)

( * ) Notice: Subject to any disclaimer, the term of this patent is extended or adjusted under 35 U.S.C. 154(b) by 0 days.

(21) Appl. No.: 14/161,598

(22) Filed: Jan. 22, 2014

(65) Prior Publication Data

US 2015/0203414 A1 Jul. 23, 2015

(51) Int. Cl.
- *C05F 11/00* (2006.01)
- *C05F 11/02* (2006.01)
- *C05F 11/08* (2006.01)
- *B09C 1/08* (2006.01)
- *C05D 9/00* (2006.01)
- *C05G 3/00* (2006.01)

(52) U.S. Cl.
CPC ... *C05D 9/00* (2013.01); *B09C 1/08* (2013.01); *C05F 11/00* (2013.01); *C05F 11/02* (2013.01); *C05F 11/08* (2013.01); *C05G 3/0041* (2013.01); *C05G 3/0058* (2013.01)

(58) Field of Classification Search
None
See application file for complete search history.

(56) References Cited

U.S. PATENT DOCUMENTS

| | | | | |
|---|---|---|---|---|
| 6,302,936 | B1 * | 10/2001 | Adam | 71/13 |
| 6,419,722 | B1 * | 7/2002 | Adam | 71/13 |
| 2009/0188290 | A1 * | 7/2009 | Marler | 71/21 |
| 2012/0057936 | A1 * | 3/2012 | Cook | 405/128.7 |
| 2012/0090367 | A1 * | 4/2012 | Wright et al. | 71/28 |
| 2012/0125064 | A1 * | 5/2012 | Joseph et al. | 71/27 |

* cited by examiner

*Primary Examiner* — Wayne Langel
(74) *Attorney, Agent, or Firm* — Mersenne Law

(57) ABSTRACT

A particlized biotic soil amendment product for preparing a damaged or degraded soil ecosystem to establish a self-sustaining floral/vegetative rhizosphere contains a mixture of inorganic "mineral" material, organic material, charcoal, and small amounts of inoculants to promote the growth of beneficial microorganisms including mycorrhizal fungi and nitrogen-fixing bacteria. These ingredients are prilled to form roughly uniform, spherical, ovoid, capsular or other-shaped particles suitable for handling with prior-art agricultural machines. The prilling should produce particles that are resilient enough to survive standard shipping, handling and application procedures, but thereafter break down under irrigation and weathering so as to release their ingredients for use by plants in the vicinity.

19 Claims, 3 Drawing Sheets

```
Mix Inorganic (Mineral),
Organic and Charcoal
          │
         210
          ▼
Moisten with Liquid Binder
          │
         220
          ▼
   Heat & Agitate to
     Form Particles
          │
         230
          ▼
  Prepare Microorganism
    Solution (Liquid)
          │
         240
          ▼
   Spray-Coat Particles
    with Microorganisms
          │
         250
          ▼
┌ ─ ─ ─ ─ ─ ─ ─ ─ ─ ─ ─ ┐
   Finish Particles with
     Biocompatible Oil
└ ─ ─ ─ ─ ─ ─ ─ ─ ─ ─ ─ ┘
          │
         260
          ▼
        Done
```

PARTICLIZED BIOTIC SOIL AMENDMENT

CONTINUITY AND CLAIM OF PRIORITY

This is an original U.S. patent application.

FIELD

The invention relates to improving soil condition to promote plant growth. More specifically, the invention relates to compositions and methods for establishing a self-perpetuating soil-plant ecosystem.

BACKGROUND

Humans have engaged in agriculture for millennia, and have developed a wide array of practices and products to achieve improved efficiency (i.e., greater production per cost or effort expended). For example, mechanically disturbing soil ("tilling" or "plowing") loosens the soil and improves plant-root penetration, while fertilization focuses on adding nutrients (nitrogen, phosphorus and potassium) to the soil so that they will be available to growing plants. Many prior-art practices and materials yield significant (but often declining) returns in productivity. Eventually, a greater investment of time, energy or materials, or even entirely different techniques, may be required to maintain accustomed yields.

On the other hand, land that is undisturbed, unprocessed and un-augmented, may nevertheless support a thriving complement of plant life from season to season, dependent principally on natural conditions such as amount of sunlight and rainfall or other water sources. In such a self-sustaining natural system, the variety of plant life provides numerous benefits, such as food and habitat for insects and other animals, processing of carbon dioxide from the atmosphere, and erosion control. However, once such a system is disturbed, it often takes years or decades to restore the prior balance.

Owners and stewards of land often wish to (re-)establish a "natural," self-perpetuating floral ecosystem on a parcel that has been disrupted by fire, flood, or development such as mining, construction or grading. Current practices include removing and storing the topsoil of an area that will be affected, and replacing the topsoil later (e.g., after construction); or applying compost or fertilizer to attempt to restart plant growth. These approaches are often expensive, and sometimes fail to work on the first few attempts. Techniques and materials to accomplish revegetation with reduced recurring effort or investment may be of value in this field.

SUMMARY

A biotic soil-amendment composition including charcoal, bacterial and fungal agents, organics and mineral supplements is processed to produce uniform particles or pellets that are compatible with existing agricultural machinery. The soil amendment provides many of the important ingredients for "jump-starting" plant growth in a degraded environment, thus aiding in the (re-)establishment of a self-sustaining ecosystem with reduced need for repeated applications of physical and/or chemical interventions.

BRIEF DESCRIPTION OF DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

FIG. 2 is a flow chart outlining a prilling process to produce the inventive soil amendment particles.

DETAILED DESCRIPTION

Figure 1A:
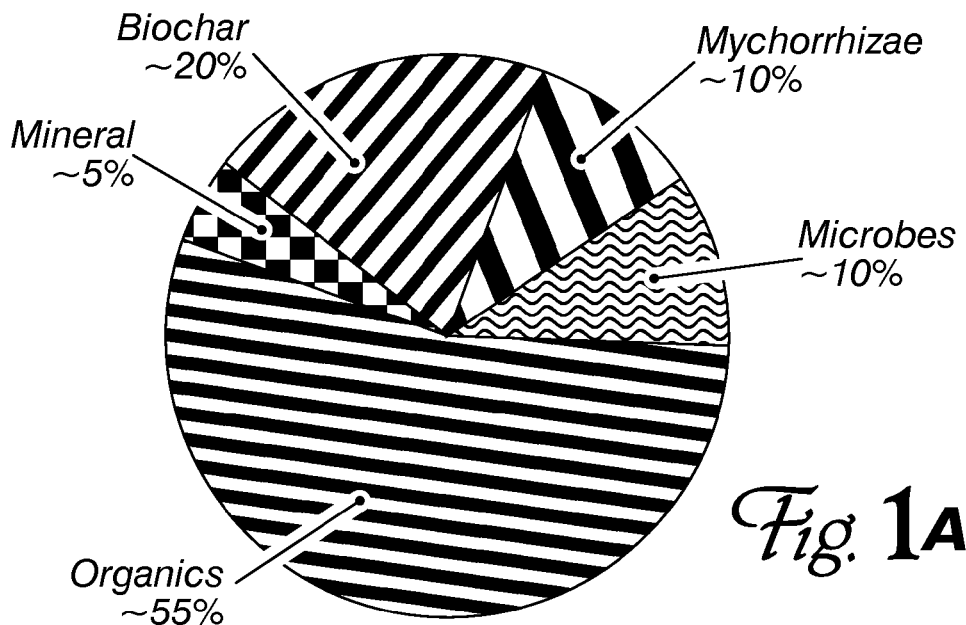
FIGS. 1A-1D show percentage-by-weight of active ingredients in several specific formulations of the beneficial soil-amendment composition.

Biotic soil amendments ("BSAs") are composite materials containing ingredients that help plants grow and thrive. They are similar in principle to fertilizers, but BSAs function by facilitating and supporting the development of a complete plant nutrient recycling ecosystem, whereas fertilizers merely deliver elements plants need to grow (principally nitrogen, phosphorus and potassium) in a form that plants can easily access. Fertilizer does not "close the loop" so that an ecosystem can become self-sustaining: typically, more fertilizer must be added at each new growing season.

One biotic soil amendment is described in the present inventor's U.S. Pat. No. 8,430,599, Method and Composition for Improving Soil Quality. That BSA is economical and effective, but its physical properties make it unsuitable for application with some widely-used agricultural machinery. The new composition described in the present specification was developed through efforts to make a BSA that is compatible with spin-broadcast machinery, plant insertion machinery and other equipment that functions better with discrete, uniform particle or pellet-form materials than with the previously-disclosed roughly uniform, amorphous mixture of particles ranging in size from microscopic to a few millimeters, interspersed with fibers and other structures of generally micron to centimeter dimensions.

Embodiments of the invention start with the compounding of a biotic soil amendment mixture comprising several ingredients. These are mixed and then subjected to a process called "prilling" to create the inventive particlized BSA product. (It is appreciated that prilling is typically understood to mean "melting and then allowing the melted material to congeal or freeze in midair to produce small particles or spheres." However, some ingredients of a BSA are heat-sensitive and cannot be "melted" without damage. Thus, "prilling" in this disclosure should be taken to mean "a process for converting a predetermined mixture of ingredients into discrete, roughly uniform particles of suitable size without damaging or destroying the properties of the ingredients.")

The common or core active components of a particlized biotic soil amendment are an inorganic "mineral" fraction, a partially-decomposed organic material fraction, and charcoal; with active fungal and bacterial agents. These ingredients are selected to mimic functions of materials found in a natural, self-sustaining rhizosphere. Some of them are consumed or broken down by the first generation of plants, but those plants replace the consumed elements when they die, so subsequent generations of plants have the benefit of similar resources. In preferred embodiments, recycled and organic ingredients are selected to reduce the environmental impact of producing the BSA product, and to avoid introducing materials which might degrade or decompose into detrimental contaminants.

The main ingredient (by weight) in most embodiments is an inorganic, "mineral" material, usually in powder, dust or granular form, which provides an initial "bootstrap" supply of essential minerals and trace elements to support plant growth. This material often provides pH buffering and aids in soil water retention as well. One suitable inorganic is available commercially under the trade name Cascade Minerals® from Central Oregon Basalt Products, LLC. Typical mineral content is between about 50% and about 75% by weight of the active ingredients. However, as discussed below, there are applications where as little as 5% by weight is acceptable.

Basalt minerals are used as the inorganic ingredient in many embodiments of the inventive BSAs. These minerals are comprised of Chelate and chelating agents. Chelate (from the Greek word "chel," meaning a crab's claw) refers to the pincer-like manner in which metal ions are bound in an organic ring structure. Chelating agents will bind relatively insoluble metals such as iron in high pH soil and make it available to plants. The chelating agents of the metal ions help protect the chelated ions from undesired chemical reactions and hence increase the availability of these ions to plants. Chelation in the soil may also reduce the concentration of some metal ions to a non-toxic level. This process is usually accomplished by humic acid and high-molecular-weight components of organic matter. Metal ions forming chelates are more stable than the free ions. Chelation processes reduce the loss of nutrients through leaching and increase the mobility of nutrients in soil. This increased mobility enhances the uptake of these nutrients by plants.

Cascade Minerals® is derived from finely ground volcanic basalt (colloquially, "rock dust"); no other ingredients are necessary. Since no synthetic chemicals or man-made additives are required to produce this inorganic (mineral) ingredient, its use is compatible with organic farming practices. Compared to other volcanic rocks, basalt weathers relatively quickly, which means it breaks down readily in soil. Applying finely-ground basalt powder is like adding a fresh deposit of natural soil minerals to the soil.

Silicon (in the form of silicon dioxide, $SiO_2$, also known as silica) is a major component of the ground basalt. Although silicon is the second most abundant element in the earth's crust (after oxygen), it has been weathered away from many agricultural soils. Since the element is important to plant growth and health (e.g., it makes cell walls stronger so that plants are more resistant to pests and disease, and so that they can stand taller) and helps plants produce more-nutritional and flavorful fruits and vegetables, its presence in embodiments of the invention provides many benefits.

Following silicon in the inorganic or mineral component, and roughly in order of decreasing abundance, iron, calcium, aluminum, sodium and/or magnesium may be present (typically as ions in chelates). Their presence and relative quantities depend primarily on the source of the mineral ingredient. Elemental metals need not be processed and formed into chelate by manufacturing activities; instead, it is preferable to simply crush, grind or pulverize the same sorts of rocks that would (in a natural setting) weather away to release the same soil nutrients. In effect, an embodiment of the invention uses mechanical steps (crushing, grinding) to mimic longer-term natural processes, and incorporates the results of those steps as the mineral portion of the particlized BSA.

The next-largest fraction by weight in most embodiments is an organic substance such as Dakota Soil & Plant Enhancer from Dakota, Inc. of East Grand Forks, Minn. This material serves as an initial source of food and shelter for the microorganisms described below, and also provides structure ("matrix") to the applied material, helping it remain in place after application. The organic fraction may include partially-decomposed ("composted") organic plant material (e.g., peat) and fibrous material such as burlap, jute, hemp or straw. However, unlike the prior-art biotic soil amendment described in U.S. Pat. No. 8,430,599, it is preferred here to use fiber that has been processed to reduce the size and length of fibers to very short lengths. This is because longer fibers tend to make the particles of an embodiment of the present invention look fuzzy or spiky, and to reduce the structural integrity of the particles so that they break or crumble earlier than desired during material handling. The organic fraction, by weight of active ingredients, ranges from about 2% to about 55%.

Charcoal follows the organic fraction by weight in most embodiments. This ingredient provides a readily-available carbon source and serves as a substrate or host material for microbial development. Since a function of the microbes is to break down biomass into basic nutrients required by growing plants, charcoal is an important part of the chain of nutrient exchange between plant roots and the soil they grow in, supporting healthy plant establishment and development. Charcoal helps the biotic soil amendment filter and retain water, and can immobilize or ameliorate the effects of some contaminants. Embodiments can use either ordinary or activated charcoal. (The difference is in the preparation of the charcoal: ordinary or non-activated charcoal is produced by anaerobic pyrolysis of organic biomass such as wood [usually]; while activated charcoal has been further processed with heat or chemicals to increase its surface area.) A preferred form of charcoal is known as "biochar," which is typically made from organic material that is hard to compost (e.g., brush cuttings and weeds). Embodiments contain charcoal (including without limitation biochar) between about 12% and about 22% by weight.

Finally, embodiments include two additional ingredients in smaller amounts (by weight), but these are important to the efficacy of the mixture. The first of these is a fungus or fungal spore that is effective to promote the development of beneficial mycorrhizae. Mycorrhizae are symbiotic associations between a fungus and the roots of a vascular plant (such as the plants that are being introduced to an area treated with the inventive substance). In this disclosure, mycorrhiza or mycorrhizae should be understood to refer to fungi, fungal spores, or other agents present in an embodiment that promote the development of mycorrhizae, and not (for example) merely the fully-formed symbiotic association itself.

Mycorrhizae may be subdivided into three general types: endomycorrhiza, ectomycorrhiza and ericoid mycorrhiza, according to the physical and functional characteristics of the symbiosis. *Pisolithus* tinctorius, *Laccaria* bicolor, *Suillus luteus* and *Suillus* bovines are species of fungus that may be used as the mycorrhizae-promoting agent in an embodiment, but they are not the only ones (nor need an embodiment use only one species).

A suitable product for this ingredient of an embodiment is available commercially as MycoApply Micronized Endo/Ecto mycorrhizal powder from Mycorrhizal Applications of Grants Pass, Oreg. The product consists of a blend of spores from endo- and ecto-fungi species. Mycorrhizae-promoting agents are present in embodiments between about 0.5% and about 10% by weight.

The second trace ingredient is one or more microbes (e.g., bacteria), which function alone or in association with plants to perform a variety of functions, including breaking down biomass, degrading hydrocarbons and fixing atmospheric nitrogen into ammonia and other nitrogen-containing substances (which may then be used by the growing plants). Hundreds of different species of bacteria may be used in this application. Some commonly-available genera are *Azospirillum, Bacillus, Streptomyces, Rhizobium, Pseudomonas* (e.g., *Pseudomonas fluorescens*) and *Xanthomonas*. Commercially-available products such as MicroMX Microbiological Organics and TazoST *Azospirillum* Bacteria from TerraMax Inc. of Cottage Grove, Minn., and/or off-the-shelf or custom strains and blends from other providers may be used. An embodiment may contain a monoculture or a mixture of such microbes, at a concentration between about 0.5% and about 10% by weight.

Note that both fungal spores and bacteria (together, the "biologicals" component) are extremely lightweight (low mass). Pure spores or bacteria at the 0.5%-10% by weight ranges given above would contain far more microorganisms than required in an embodiment. The "by-weight" ranges presume that the organisms are commercially packaged in powder, flake, granule, pellet or similar forms. Such packages contain a large amount (by weight) of inert filler material. This facilitates preparation of bulk mixtures such as embodiments of the invention by allowing weight-based recipes and by simplifying mixing procedures to achieve even distribution of the microorganisms throughout the product.

An effective quantity of microorganism inoculants (mycorrhizae-promoting agents and bacteria) for an embodiment can also be determined based on a biological-activity study of the organisms in the embodiment, compared to an embodiment formulated by weight using commercially-packaged organisms as described above. In other words, the important criterion in preparing a soil-amendment product according to an embodiment of the invention is not the weight of the microorganism-plus-filler, but the number of live or viable organisms present in the biotic soil amendment particles when they are ready to be applied. For example, in an embodiment formulated at 1.5% by weight of the mycorrhizae-promoting agent MycoApply Micronized Endo/Ectos, the resulting mixture contains approximately 3,300 spores[1] per kilogram (1,500 spores per pound).

[1] Common assays estimate a number of viable organisms by culturing the material and counting visible colonies. Since it is not possible to determine if a colony arose from a single spore or cell, or a clump of many spores/cells, the biological-activity numbers are more properly termed "colony-forming units" or "CFUs" rather than individual "spores," "bacteria" or "organisms."

Similarly, in an embodiment formulated with 0.45% by weight of MicroMX Microbiological Organics and 1.05% by weight of TazoST *Azospirillum* Bacteria, the resulting mixture contains about $3.98 \times 10^{17}$ organisms per kilogram ($1.81 \times 10^{17}$ per pound). Suitable live- or viable-organism counts may be calculated from the by-weight percentages given above and the organism-per-weight assessment of the fungal and microorganism inoculants. Microbiological supply companies can also formulate custom bacteria combinations to address specific environmental concerns. Such selection is within the capabilities of an ordinary practitioner who is preparing a particlized biotic soil amendment according to an embodiment of the invention.

FIGS. 1A-D show four different formulations for specific embodiments of the invention. The ratios are by weight of active ingredients; it is appreciated that an embodiment may further comprise an inert material such as a filler or binder that has negligible biological activity but provides improved pelletizing characteristics, mechanical performance or shelf stability.

FIG. 1A is suitable for agricultural applications. It includes the smallest mineral fraction, 5% by weight, and the largest organic fraction at 55%. Biochar is also high, at 20%. Mychorrhizae-promoting agents and microbes are also high, at 10% by weight each. (By biological activity, this embodiment would measure at about 22,000 spores per kilogram, and $2.66 \times 10^{18}$ microbes per kilogram.) Agricultural soils generally have adequate mineral content already, but may lose more organic material (through harvesting operations) and benefit more from the increased organic content of this embodiment. The high biochar content helps offset carbon loss and may also improve fertilizer effectiveness, and the large biological component replaces activity lost through harvest.

Figure 1B:
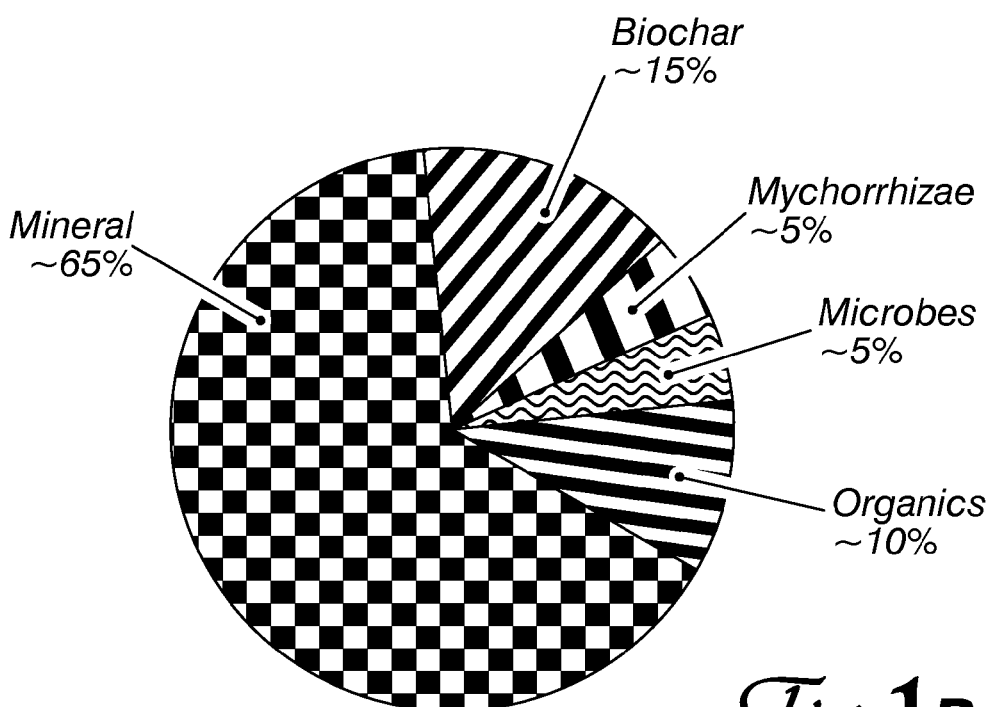

FIG. 1B is suitable for use in supporting turf (football, baseball and soccer fields, for example, as well as golf courses, commercial and residential lawns). A larger mineral fraction (at 65% by weight) is followed by moderate organic and charcoal (biochar) fractions at 10% and 15%, respectively. Mychorrhizae and microbes make up the balance at 5% each, or 11,000 spores/kg and $1.33 \times 10^{18}$ microbes/kg. The high mineral content is believed to help with nutrient transfer to the plants (grasses). A smaller organic component is adequate because the fields often have residual organic material from mowing and clipping.

Figure 1C:
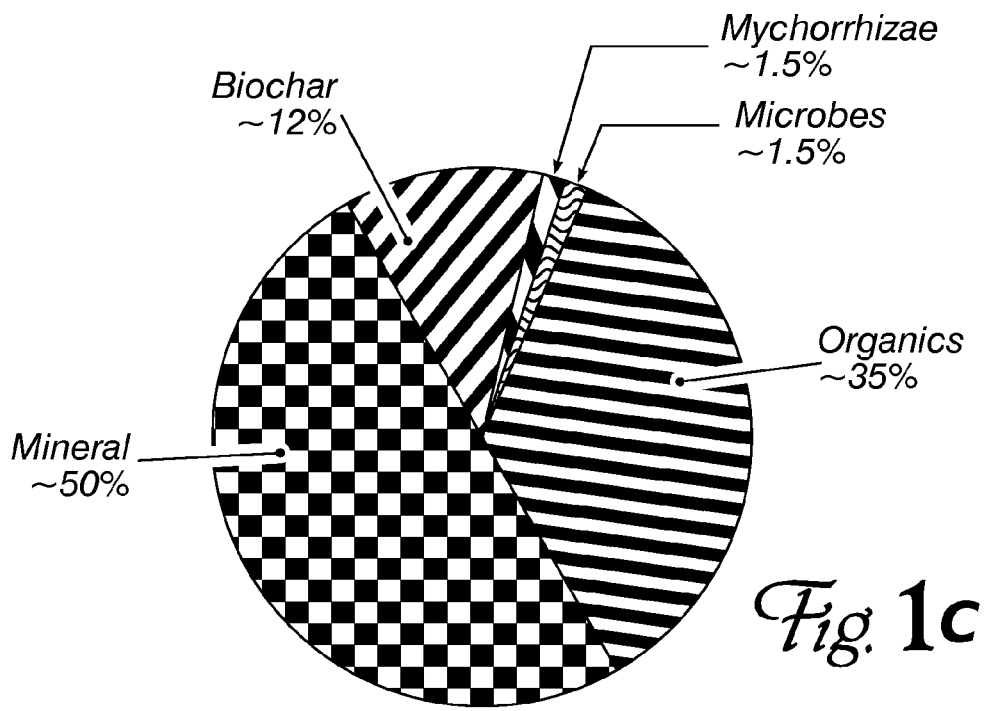

FIG. 1c is good for restoring parcels damaged by fire, construction, mining or other circumstances. A mineral fraction at about 50% by weight, with organics at 35%, biochar at 12%, and mychorrhizae and microbes at 1.5% each. Depleted soils are often lacking in native organic material, and a comparable mineral fraction provides a good balance to the organics added by this embodiment.

Figure 1D:
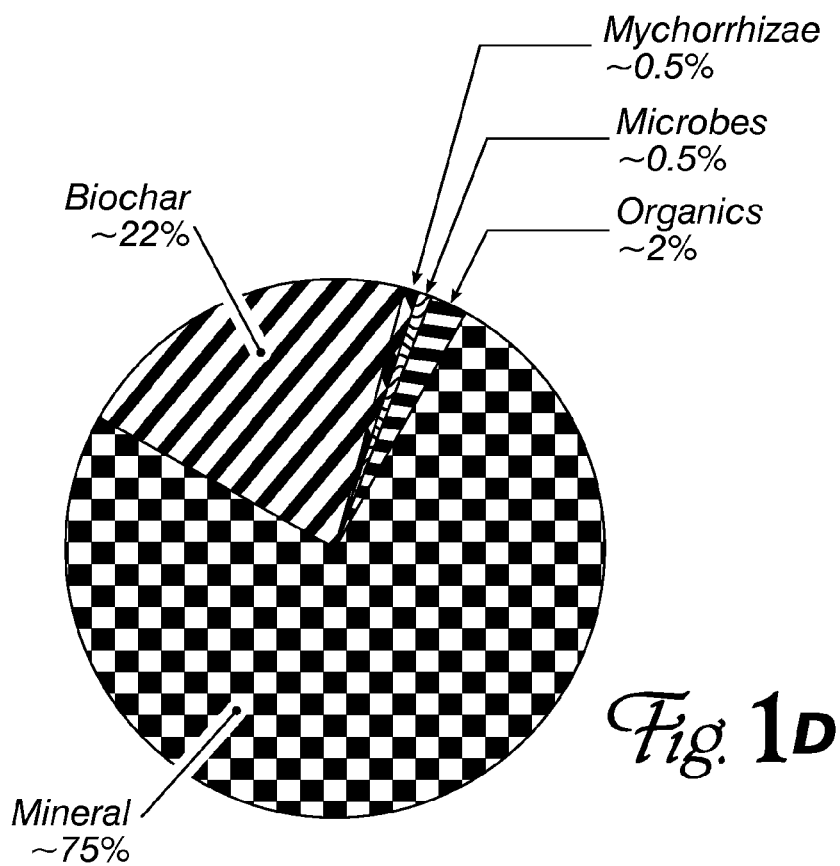

Finally, FIG. 1D shows a formulation that is suitable for use in a garden or small agricultural setting: only 2% organics and 0.5% each of mychorrhizae and microbes, as most gardens will have an existing compost and biological base. The large (75%) mineral component helps build improved soil, while biochar rounds out the active ingredient formulation at 22%.

A number of factors affect the exact formulation chosen. Several of the ingredients are relatively expensive, so one naturally wishes to include as small an amount as will be effective. Thus, for example, at low application rates, the relative amount (by weight) of the trace ingredients (mychorrhizae-forming agents and multipurpose microbes) may be higher than when an embodiment for heavier application is being formulated. Selection of specific formulae within the percent-by-weight ranges given below is possible by one of ordinary skill without undue experimentation.

| Active Ingredient | Minimum | Maximum |
| --- | --- | --- |
| Minerals | 5% | 75% |
| Organics | 2% | 55% |
| Charcoal/Biochar | 12% | 22% |
| Mychorrhizae | 0.5% | 10% |
| Microbes | 0.5% | 10% |

The four sample formulations described above illustrate the corner-cases of embodiments—those recipes with the smallest and/or largest reasonably useful fractions of the various ingredients, and intended for specific purposes. An embodiment with good general properties (considering efficacy in a variety of uses, ingredient price and ease of manufacturing) can be made with a mineral/inorganic fraction of between 45% and 55%, an organic fraction between 30% and 40% and a charcoal (or biochar) fraction between 8% and 15%, with between 1% and 3% mychorrhizal inoculants and 1% and 3% of bacteria (all percentages by weight, as explained above).

Once the components of the embodiment have been mixed together, a prilling process is performed to make sturdy, roughly uniform particles of a suitable size. As noted earlier, this process should not use excessive heat, as that might damage the bacteria and/or mycorrhizae ingredients. FIG. 2 outlines a process that has been used successfully to produce the inventive BSA particles.

First, the inorganic, organic (fiber) and charcoal ingredients are mixed together (210). These dry ingredients are moistened (e.g., with lignin sulfonate or similar suitable binder liquid) to produce a damp powder or paste (220) (a moisture content of about 20% has been found to produce desirable handling characteristics). The damp powder or paste is introduced to a pan granulator, where it is heated and agitated to form pellets or particles containing soil minerals, fiber and charcoal held together by binder residue (230). Next, a liquid preparation of mycorrhizae spores and microorganisms is produced (240) and sprayed onto the particles (250). (This spraying takes place after the particles have cooled to temperatures that will not damage the microorganisms.)

Finally, the particles may be finished with a biocompatible, biodegradable oil such as soybean oil (260), to reduce dust generation during subsequent material handling (e.g., packaging, transport, loading into distribution machinery and application).

The foregoing prilling process (or suitable alternatives thereto) may create roughly spherical, ovoid or capsular particles, or pellets of other shapes. Shapes and sizes may be adjusted for compatibility with particular machinery or distribution systems, and/or to improve the pellets' resistance to damage during transport and handling. Embodiments typically have particles whose largest dimension is in the range of about 1 mm to about 25 mm. (For example, a spherical particle might have a diameter between 1 mm and 25 mm. An oval particle might have a length along its major axis of between 1 mm and 25 mm, while its minor axis length would be shorter. A particle might be shaped like a capsule—two hemispheres at either end of a cylinder—where the overall length is between 1 mm and 25 mm, with a cylindrical diameter of less than its overall length.)

Although it is desired that the particles not break or crumble prior to application, they should disintegrate soon after application under irrigation, weather and other influences at the application site.

A particlized biotic soil amendment according to an embodiment of the invention can be applied effectively by using standard agricultural equipment. In one common situation, the BSA particles can be fed through a manual or powered spin-broadcast fertilizer spreader. They can also be hand-broadcast fairly uniformly and with less mess than a non-particlized product. Some particle shapes and sizes are suitable for use with a seed planter (a machine that plants one or a few seeds in each of a series of depressions of suitable depth and spacing, and which may also be configured to place a close of another substance, such as fertilizer—or a BSA particle of the present invention—nearby or in the same depressions).

Particles can also be distributed through a hydroseeder, although the water, pressure and turbulence may cause the particles to disintegrate during such application.

In some embodiments, plant seeds (such as native plant seeds, wildflowers or the like) may be added to the BSA mixture before prilling, so that distributing the particlized BSA also acts to seed the area where the particles are applied. The prilling process may require modification to prevent heat from damaging or destroying the plant seeds.

In the preceding description, numerous details were set forth. It will be apparent, however, to one skilled in the art, that the present invention may be practiced without some of these specific details. In some instances, well-known structures and devices are shown in block diagram form, rather than in detail, so as to avoid obscuring or obfuscating the invention.

The applications of the present invention have been described largely by reference to specific example formulations and percent-by-weight recipes. However, those of skill in the art will recognize that other effective particlized biotic soil amendment mixtures not specifically identified above can nevertheless be produced by adjusting the ingredient ratios within the ranges recited below. Such variant formulations are understood to be captured according to the following claims.

I claim:

1. A soil amendment composition comprising:
   between 5% and 75% by weight of an active inorganic material;
   between 2% and 55% by weight of an organic material;
   between 12% and 22% by weight of a charcoal material;
   between 0.5% and 10% by weight of a mycorrhizae-promoting agent; and
   between 0.5% and 10% by weight of a microbial component,
   the mixture formed into a plurality of roughly uniform particles of suitable size and shape for compatibility with a standard agricultural distribution machine.

2. The soil amendment composition of claim 1 wherein the active inorganic material, organic material, charcoal material, mycorrhizae-promoting agent and the microbial component are measured as percentages of a total active-ingredient weight, the soil amendment composition further comprising:
   a filler material of negligible biological activity.

3. The soil amendment composition of claim 1 wherein the inorganic material is a mechanically-pulverized rock product.

4. The soil amendment composition of claim 1 wherein the inorganic material is a mechanically-pulverized basalt.

5. The soil amendment composition of claim 1 wherein the organic material is a partially-decomposed organic plant material that has been processed to reduce a size and a length of fibers to very short lengths.

6. The composition of claim 1 wherein the charcoal material is biochar.

7. The composition of claim 1, containing:
   between about 45% and about 55% by weight of the inorganic material;
   between about 30% and 40% by weight of the organic material;
   between about 8% and about 15% by weight of the charcoal material;
   between about 1% and about 3% by weight of the mycorrhizae-promoting agent; and
   between about 1% and about 3% by weight of the microbial component.

8. The composition of claim 1, containing:
   about 5% by weight of the inorganic material;
   about 55% by weight of the organic material;
   about 20% by weight of the charcoal material;
   about 10% by weight of the mycorrhizae-promoting agent; and
   about 10% by weight of the microbial component.

9. The composition of claim 1, containing:
   about 65% by weight of the inorganic material;
   about 10% by weight of the organic material;
   about 15% by weight of the charcoal material;
   about 5% by weight of the mycorrhizae-promoting agent; and
   about 5% by weight of the microbial component.

10. The composition of claim 1, containing:
    about 50% by weight of the inorganic material;
    about 35% by weight of the organic material;
    about 12% by weight of the charcoal material;

about 1.5% by weight of the mycorrhizae-promoting agent; and about 1.5% by weight of the microbial component.

11. The composition of claim 1, containing:
about 75% by weight of the inorganic material;
about 2% by weight of the organic material;
about 22% by weight of the charcoal material;
about 0.5% by weight of the mycorrhizae-promoting agent; and
about 0.5% by weight of the microbial component.

12. The composition of claim 1 having a mycorrhizae-promoting colony-forming unit estimate of between about 1,100 spores/kilogram and about 22,000 spores/kilogram.

13. The composition of claim 1 having a microorganism colony-forming unit estimate of between about $1.33 \times 10^{17}$ organisms/kilogram and about $2.66 \times 10^{18}$ organisms/kilogram.

14. The composition of claim 1 wherein the particles are finished with a biocompatible oil.

15. The composition of claim 14 wherein the biocompatible oil is soybean oil.

16. The composition of claim 1 wherein a largest dimension of the particles is between about 1 mm and about 25 mm.

17. The soil amendment composition of claim 1, wherein the roughly uniform particles are roughly spherical particles, roughly ovoid particles, or roughly capsular particles.

18. The soil amendment composition of claim 1, wherein the standard agricultural distribution machine is one of a spin-broadcast fertilizer spreader or a seed planter.

19. A particlized biotic soil amendment, comprising:
between 5% and 75% by weight of an active mineral material;
between 2% and 55% by weight of organic material;
between 12% and 22% by weight of charcoal;
a first trace amount of a mycorrhizae-promoting agent; and
a second trace amount of a microbial component,
said composition processed after mixing the mineral material, the organic material and the charcoal to produce a plurality of roughly uniform particles of suitable size and shape for compatibility with a standard agricultural distribution machine, wherein
a biological-activity assay of the processed composition shows that the composition contains between about 1,100 and about 22,000 spores/kg of the mycorrhizae-promoting agent and between about $1.33 \times 10^{17}$ and about $2.66 \times 10^{18}$ organisms/kg of the microbial component.

* * * * *